(12) United States Patent
Herpel

(10) Patent No.: US 6,292,199 B1
(45) Date of Patent: Sep. 18, 2001

(54) METHOD AND DEVICE FOR COPYING AND DECODING DIGITIZED FRAMES OF A SPECIAL EFFECTS FILM

(75) Inventor: Carsten Herpel, Hannover (DE)

(73) Assignee: Deutsche Thomson-Brandt GmbH (DE)

( * ) Notice: Subject to any disclaimer, the term of this patent is extended or adjusted under 35 U.S.C. 154(b) by 0 days.

(21) Appl. No.: 08/900,949

(22) Filed: Jul. 25, 1997

(30) Foreign Application Priority Data

Jul. 26, 1996 (DE) ................................ 196 30 295

(51) Int. Cl.[7] ..................................... G06T 15/00
(52) U.S. Cl. ............................................. 345/474
(58) Field of Search .................... 345/473, 474, 345/302

(56) References Cited

PUBLICATIONS

J. De Lameillieure, R. Schafer, "MPEG–2 Bildercodierung fur das digitale Fernsehen", Fernseh–Uno Kino–Technik, 48. Nr. Mar. 1994, pp. 99–107.

D. Teichner, "Datenreduktionsverfahren im Bereich der Videoproduktion " Fernseh_Uno Kinorwxhnik 49. Jahrgang Nr. Jun. 1995 Seiten 347–355.

*Primary Examiner*—Cliff N. Vo
(74) *Attorney, Agent, or Firm*—J. S. Tripoli; E. P. Herrmann; R. H. Kurdyla

(57) ABSTRACT

A method for coding digitized frames of a stroboscope-like special effects film is proposed, in which alternately a first number of frames of a first film scene and a second number of frames of a second film scene is shown. Two frame buffers (30, 32) are available for coding the frames. The method is characterized by the fact that the two frame buffers (30, 32) are operated separately so that in each case one of the frame buffers (30) is permanently used for predicting frames of the first film scene and the other frame buffer (32) is permanently used for predicting frames of the second film scene. In addition, a corresponding method for decoding frames coded in this manner and devices for coding and decoding digitized frames of a stroboscope-like special effects film are also proposed.

19 Claims, 4 Drawing Sheets

| No.: | picture_coding_extension() { | No. of bits | Mnemonic |
|---|---|---|---|
| 1 | extension_start_code | 32 | bslbf |
| 2 | extension_start_code_identifier | 4 | uimsbf |
| 3 | f_code[0][0]   /* forward horizontal */ | 4 | uimsbf |
| 4 | f_code[0][1]   /* forward vertical */ | 4 | uimsbf |
| 5 | f_code[1][0]   /* backward horizontal */ | 4 | uimsbf |
| 6 | f_code[1][1]   /* backward vertical */ | 4 | uimsbf |
| 7 | intra_dc_precision | 2 | uimsbf |
| 8 | picture_structure | 2 | uimsbf |
| 9 | top_field_first | 1 | uimsbf |
| 10 | frame_pred_frame_dct | 1 | uimsbf |
| 11 | concealment_motion_vectors | 1 | uimsbf |
| 12 | q_scale_type | 1 | uimsbf |
| 13 | intra_vlc_format | 1 | uimsbf |
| 14 | alternate_scan | 1 | uimsbf |
| 15 | repeat_first_field | 1 | uimsbf |
| 16 | chroma_420_type | 1 | uimsbf |
| 17 | progressive_frame | 1 | uimsbf |
| 18 | composite_display_flag | 1 | uimsbf |
|  | if ( composite_display_flag ) { |  |  |
| 19 | v_axis | 1 | uimsbf |
| 20 | field_sequence | 3 | uimsbf |
| 21 | sub_carrier | 1 | uimsbf |
| 22 | burst_amplitude | 7 | uimsbf |
| 23 | sub_carrier_phase | 8 | uimsbf |
|  | } |  |  |
| 24 | stroboscope_mode | 1 |  |
|  | if ( stroboscope_mode ) { |  |  |
| 25 | scene1_flag | 1 |  |
|  | } |  |  |
| 26 | next_start_code() |  |  |
|  | } |  |  |

Fig.7

METHOD AND DEVICE FOR COPYING AND DECODING DIGITIZED FRAMES OF A SPECIAL EFFECTS FILM

BACKGROUND OF THE INVENTION

1. Field of the Invention

The invention relates to a method for coding and decoding digitized frames of a special effects film and devices for coding and decoding digitized frames of a special effects film.

2. Prior art

The invention is based on a method for coding digitized frames of a special effects film of the generic type of the independent claim 1.

Previously known coding methods for full-motion pictures are usually defined with relatively few options. The MPEG2 standard has already begun to change this situation since it already allows a relatively large number of optional configurations.

For future standards for coding full-motion pictures, it is desirable that they should allow even more flexibility, making it possible to adapt the coding parameters to the characteristics of the picture material to be coded to an even greater degree than hitherto. In this connection, special parameters for classes of video signals can then also be taken into account which do not occur particularly frequently but can be coded much better by a special choice of parameters.

Such a class of video signals are stroboscope-like alternations of frames from two frame sequences which, for example, occur frequently in the case of music video clips. In such a special effects film, a first number of frames of a first film scene is followed in succession by a second number of a second film scene. As a result of this, frequent scene edits, which in each case provide a completely new picture content, occur in this special effects film. Such a special effects film is digitized and then coded in accordance with the familiar MPEG2 standard, the frequent scene edits cause a high volume of data at the output of the coding device. This is due to the fact that the coding device cannot perform any redundancy compression in the first frame after the scene edit due to a successful motion estimation for various macroblocks of the frame. Thus, a large number of so-called intracoded macroblocks are produced which are coded without temporal prediction in the first frame. Compared with unidirectionally or bidirectionally predictively coded blocks, the data volume of these macroblocks is much larger. In the case of the unidirectionally or bidirectionally predictively coded blocks, only the difference between the macroblock to be transmitted and the motion-compensated macroblock is coded.

SUMMARY OF THE INVENTION

The object of the invention is to specify a coding method for the special effects film described, in which the data volume is greatly reduced in spite of the frequent scene edits occurring. For this purpose, only a small change is necessary in a coding method such as, for example, MPEG2, the hardware complexity remaining virtually unchanged.

According to the invention, the two frame buffers in the coding device are controlled separately. The two frame buffers are operated in such a manner that in each case one frame buffer is used for predicting the frames of the first film scene and the other frame buffer is used for predicting all frames of the second film scene. If no prediction takes place, both frame buffers are used for the bidirectional prediction of one frame of one of the two film scenes. Compared with the method known from the prior art, this method has the advantage that when scene changes occur, the last frame of the film scene to which the switch-over is carried out, still stored in one of the frame buffers. As a result, a motion estimation can in turn be performed for the new frame to be coded on the basis of the last frame in the frame buffer. Thus, intracoded macroblocks do not necessarily occur, even after a scene edit, and the data volume is considerably reduced.

It is particularly advantageous if only the so-called forward prediction is used for coding the frames of the special effects film. In forward prediction, the motion estimation for a frame to be coded is carried out with a reference frame which, chronologically, occurs before the frame to be coded in the sequence of frames which will be displayed later on a screen. The coding method is simplified by specifying forward prediction for the prediction mode. This is because it is not necessary to resort the frames for the coding process.

If both forward and backward prediction is to be permitted as prediction mode, it is advantageous if the frames are resorted so that the frames predicted backward are coded delayed in time and the frame from which the backward prediction is carried out, is cooled before the frames predicted backward. Such resorting has also been provided in the MPEG2 standard. In the case of a backward-predicted frame, the motion compensation for the frame to be coded is performed on the basis of a frame which, chronologically, is only displayed after the frame to be coded.

It is also advantageous if information specifying the frame buffer from which the frame is to be predicted, is inserted into the data stream for each predicted frame. This information corresponds to the information specifying which film scene the frame belongs to. A decoding device then knows immediately which frame buffer is to be used for the motion compensation.

It is additionally of advantage if information specifying that the frame belongs to a stroboscope-like special effects film sequence, is inserted into the data stream for each predicted frame. By means of this information, the decoding device can carry out a reconfiguration so that, for example, a mode is preset which allows only forward prediction or forward prediction and backward prediction.

Correspondingly, it is advantageous for a method for decoding coded frames which were coded in accordance with the method according to the invention, if the two frame buffers in the decoding device are operated separately so that again one and the same frame buffer is always used for predicting frames of the first film scene and the other frame buffer is used for predicting frames of the second film scene. This allows the coding device to code the frames motion-compensated, even after a scene change, so that the data volume for the coded frames is reduced.

In order to simplify the image processing in the decoding device, it can also be advantageous if only forward prediction is allowed for predicting frames of the stroboscope-like special effects film.

On the other hand, forward prediction or backward prediction can also be allowed, if a resorting according to the MPEG2 standard is carried out with respect to the order in which the frames are output, at least for the backward-predicted frames.

It is also advantageous if information which has been inserted into the data stream for the predicted w frames, is used for deciding the frame buffer from which the frame must be predicted. This eliminates the need for a complex analysing unit which independently determines the frame buffer from which the frame must be predicted.

Further advantageous measures for a device for coding digitized frames of a stroboscope-like special effects film are found in claims 10 to 15. Advantageous measures for a device for decoding digitized frames of a stroboscope-like special effects film are found in claims 16 to 19.

BRIEF DESCRIPTION OF THE DRAWINGS

In the drawing, three illustrative embodiments of the invention are shown and are explained in greater detail in the subsequent description. In the drawings:

FIG. 7 shows a table containing information on the coded frame, this information being inserted at the start of the data stream for the coded frame.

DETAILED DESCRIPTION OF THE INVENTION

Figure 1:
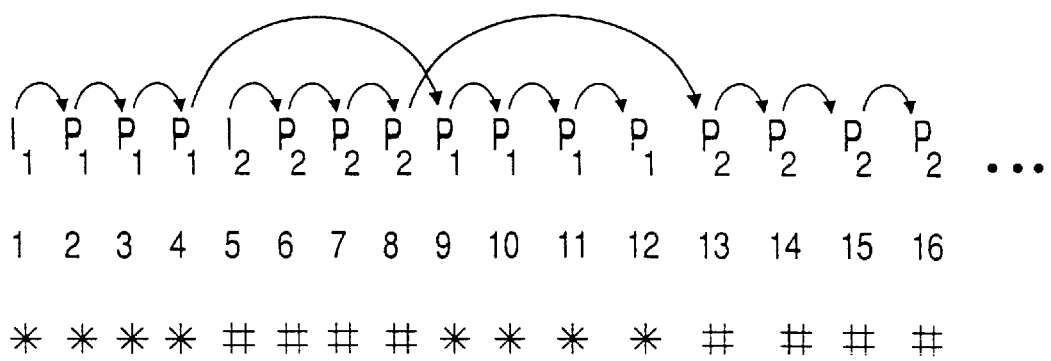
FIG. 1 shows a sequence of frames of a stroboscope-like special effects film sequence, in which only I and P frames are coded, only forward prediction being used.

FIG. 1 shows an example of a stroboscope-like special effects film sequence. In this sequence, four frames of a second film scene in each case follow four frames of a first film scene. The frames are in each case provided with indices. Index 1 means that the respective frame belongs to the first film scene and index 2 means that the respective frame belongs to the second film scene. The first frame shown is an I frame. This frame corresponds to an intra-coded frame as defined in the MPEG2 standard. In this respect, reference is made, expressly to the video section of the MPEG2 standard which is also known as an ISO standard under number ISO/IEC 13818-2.

The coding of this I frame occurs without motion compensation with the aid of another frame. The first I frame is followed by three P frames of the first film scene. The P frame corresponds to a frame which has been coded with motion compensation, a frame further back in time having been used as reference for the motion compensation. This definition of a P frame is also contained in the MPEG2 standard. The arrow pointing to the right from each P frame in FIG. 1 indicates that the respective P frame has been motion- compensated with the aid of forward prediction. The first four frames of the first film scene are followed by the first four frames of the second film scene. The first frame of the second film scene is again an I frame whilst the next three frames of the second film scene are P frames which have also been forward- predicted. The four frames of the second film scene are followed by four P frames of the first film scene. The fifth frame of the first film scene is now a P frame. It has been forward-predicted from the fourth frame of the first film scene. The second four frames of the first film scene are again followed by four frames of the second film scene. The fifth frame of the second film scene is also a P frame and has been coded from the fourth frame of the second film scene with the aid of forward prediction. The further sequence of frames of the special effects film sequence is not shown. However, it continues correspondingly, but in each case an I frame can again be inserted for both film scenes at certain intervals so that the picture quality is not impaired by multiple forward predictions. In the row below the frames shown, the sequence of coding for the frames is specified. As can be seen clearly, there is no resorting of the frames but each frame is coded in the same order in which it also appears at the input of the coding device. In the second row below the sequence of frames shown, the frame buffer is specified, in which the respective frame is entered. The * symbol indicates that the associated frame is written into the first frame buffer of a coding device and the # character indicates that the associated frame is written into the second frame buffer of a coding device. It should be pointed out that the frame buffer in each case only has space for one frame, so that when a frame is written into the same buffer again, the previously stored frame is overwritten. FIG. 1 then shows that, for example during the coding of the fifth frame of the first film scene, the fourth frame of the first film scene is still stored in the associated frame buffer, so that the forward prediction can be carried out on the basis of the fourth frame of the first film scene. Conversely, for example, it can also be seen that during the coding of the fifth frame of the second film scene, the fourth frame of the second film scene is still stored in the associated frame buffer so that a forward prediction can also be carried out on the basis of the fourth frame of the second film scene.

Figure 2:
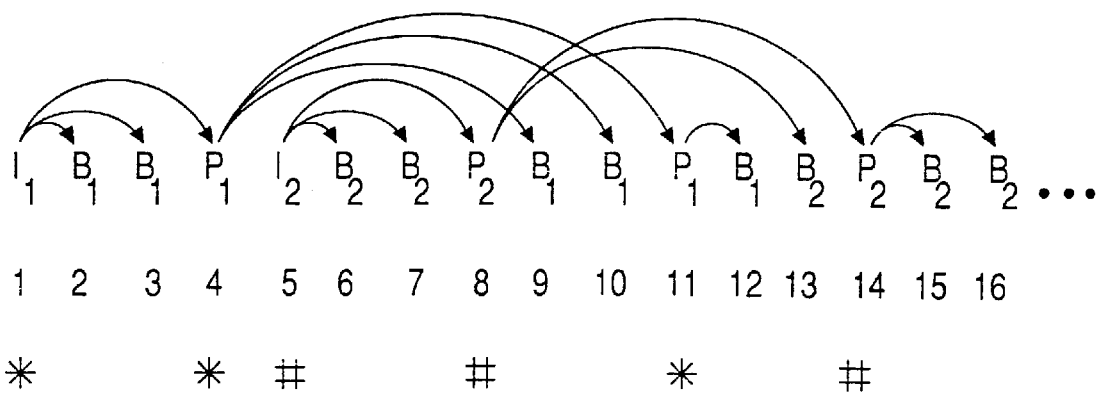
FIG. 2 shows a sequence of frames of a stroboscope-like special effects film sequence, in which I, B and P frames are used, only forward prediction being allowed.

FIG. 2 shows another sequence of frames for a stroboscope-like special effects film sequence. Again, four frames of a second film scene follow four frames of a first film scene. Here, however, so-called B frames are also coded in addition to I and P frames. According to the MPEG2 standard, a B frame corresponds to a frame which is coded motion compensated, a frame which is chronologically behind and/or a frame which chronologically follows being used as reference for the motion compensation. For the coding method shown in FIG. 2, a B frame means, according to the arrows shown, that it is only predicted by a frame which is chronologically behind, i.e. that forward prediction is used. In this respect it corresponds to a P frame but it differs from the latter at least in that during the coding of this B frame, greater tolerances with respect to the prediction error are permissible. A B frame therefore results in a smaller data volume than a P and a I frame. FIG. 2 shows that, for example, the fifth, sixth and seventh frames of the first film scene are predicted on the basis of the fourth frame of the first film scene. However, this is only possible if the fifth and sixth frame of the first film scene are not entered in the associated frame buffer. As can be seen from the second row belolw the sequence of frames, this is the case. As can be seen there, the coding order of frames in this illustrative embodiment also corresponds to the chronological sequence of the frames at the input of the coding device.

Figure 3:
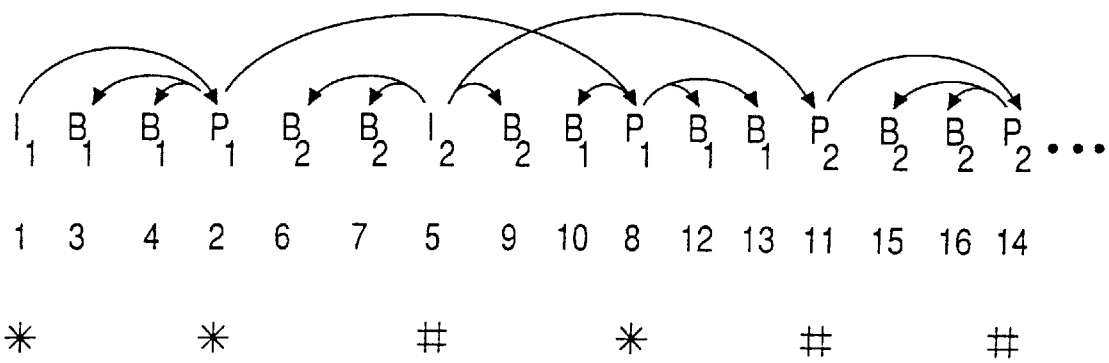
FIG. 3 shows a sequence of frames of a stroboscope-like special effects film sequence, in which I, B and P frames are used and both forward and backward prediction is allowed.

FIG. 3 shows a further sequence of frames of a stroboscope-like special effects film. In this sequence, I, B and P frames also occur. Compared with the sequence in FIG. 2, however, the difference is that the B frames are no longer exclusively only motion-compensated by forward prediction but that in this case both forward prediction and backward prediction is permissible. As can be seen from the arrows in FIG. 3, some B frames of the first film scene are motion-compensated with backward prediction. The first two and the sixth and seventh frame of the second film scene are also motion compensated by backward prediction.

However, the backward predicted frames must then be resorted with respect to the coding order. As is shown in the row below the frame sequence in FIG. 3, after the first frame of the first film scene has been coded, the fourth frame of the first film scene is coded first and then the second and third frames are coded. In this arrangement, the backward prediction for the second and third frame of the first film scene then takes place on the basis of the fourth frame of the first film scene. The next frame to be coded is the third frame of the second film scene. This is an I frame. This is then followed by the coding of the first frame of the second film scene and the coding of the second frame of the second film scene. Next, the coding of the sixth frame of the first film scene takes place which is coded as P frame. Only then is the fourth frame of the second film scene coded by means of forward prediction on the basis of the third frame of the second film scene. This is followed by a coding of the fifth frame of the first film scene by means of backward prediction. The further sequence can easily be seen with reference to the second row in FIG. 3. Again, only the I and P frames are entered in the associated frame buffer as can easily be seen from the third row in FIG. 3. The change in coding order corresponds to the proposed coding order for such a sequence of I, B and P frames in the MPEG2 standard.

Figure 4:
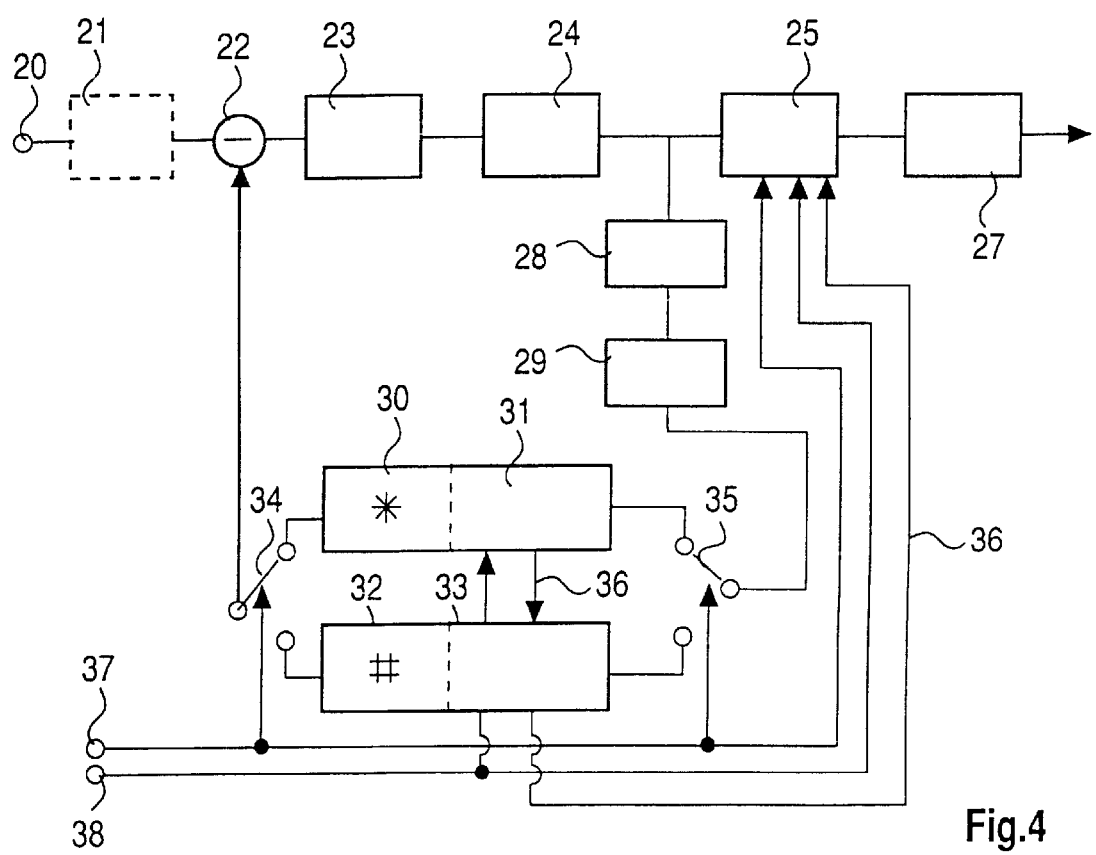
FIG. 4 shows a block diagram of a coding device for coding frames of a stroboscope-like special effects film.

In the text which follows, the configuration of a coding device according to the invention is explained with reference to FIG. 4. The reference number 20 designates the video input of the coding device. At this input, the digitized frames are present. The reference number 21 designates a sorting unit. In this unit, the aforementioned resorting of frames takes place in order to change the coding order in each case in such a manner that the B frames are in each case coded later than the P or the I frame following the B frames. However, the sorting unit 21 is only provided as an option and can be completely omitted on the illustrative embodiment shown in FIGS. 1 and 2. Reference number 22 designates a subtraction unit. The subtraction unit 22 is connected to a DCT unit. In this unit, the discrete cosine transformation takes place which is also used in coding devices known from the prior art. Reference number 24 designates a quantizing unit. Here, the coefficients obtained in the DCT unit 23 are quantized. Reference number 25 designates a VLC unit. In this unit 25, variable length coding of the coefficients after DCT transformation takes place. In addition, this unit also operates as a multiplexing unit so that additional information can also be inserted into the data stream at this point.

The data stream produced is forwarded to the buffer memory 27. At the output of the buffer memory 27, the coded frames are present in the coding order. Reference number 28 designates a dequantizing unit. Thus, the data coming from the quantizing unit 24 are immediately inversely quantized in the dequantizing unit. After that, an inverse discrete cosine transformation then follows in an IDCT unit. Thus, the reconstructed frame appears on the output of the IDCT unit 29.

This frame is input, via switching unit 35, either into a first MC unit 31 or a second MC unit 33. The respective MC unit 31, 33 carries out motion compensation for the reconstructed frame. For this purpose, it uses a reference frame which is still stored in the associated first and second frame buffer 30, 32, respectively. The MC unit determines motion vectors which are forwarded to the VLC unit 25 via the MV bus 36. Both MC units 31 and 33 have access to the MV bus 36. The motion-compensated frame is then present at the output of one of the MC units 31 or 33, respectively. It is forwarded to the subtraction point 22 via the second switching unit 34. For the sake of simplicity, the output has been shown in each case as output from the frame buffers 30, 32 in FIG. 4. At the subtraction unit 22, the difference is therefore formed between a frame present at input 20 and the associated motion-compensated frame. Then, only the difference between the two frames is processed in the units 23 to 25, which considerably reduces the data volume. It should also be mentioned that the forming of the difference at the subtraction unit 22 and the carrying out of the motion compensation via the units 30 to 35 is only carried out for the B and P frames. No motion compensation is carried out for an I frame.

The circuit units 20 to 33 also exist in coding devices known from the prior art. Reference is made in this regard to the MPEG2 standard. This very accurately describes the operation of the individual units. A significant difference compared with the known coding devices consists in the control of the two frame buffers 30, 32 and MC units 31, 33. For this purpose, the switching units 34 and 35 are used. The coding device has a film scene identification signal input 37. A special effects film identification signal input 38 is also provided. If no special effects film identification signal is present, the switching units 34 and 35 are used in accordance with the MPEG2 standard.

Via the special effects film identification signal input 38, an external unit indicates that a special effects film is to be coded next in which alternately successively a first number of frames for a first film scene and a second number of frames of a second film scene have to be coded. The external unit can be part of the equipment in a studio. This external unit then also simultaneously outputs the film scene identification signal via input 37. This informs the coding device whether currently frames of the first film scene or frames of the second film scene are present. The signal is then used for controlling the switching units 34 and 35. This ensures that prediction always occurs from the correct frame buffer 30, 32 depending on whether the frame to be coded belongs to the first film scene or to the second film scene. At the end of a coding process, the reconstructed frame present at the output of the IDCT unit is entered in the associated frame buffer 30, 32. However, this only occurs for I and P frames but not for B frames.

It should also be mentioned that the entire coding device can be configured via the special effects film identification signal input 38. In the case of the illustrative embodiments of FIGS. 1 and 2, for example, the MC units 31 and 33 can then be set in such a manner that only forward prediction is permissible. In the case of the illustrative embodiment of FIG. 3, the MC units can be set in such a manner that both forward and backward prediction is allowed for the B frames. The respective information at inputs 37 and 38 is also forwarded to the VLC unit 25. This unit inserts the appropriate information at a suitable point into the data stream of a coded frame. This will be explained below with reference to FIGS. 6 and 7.

Figure 5:
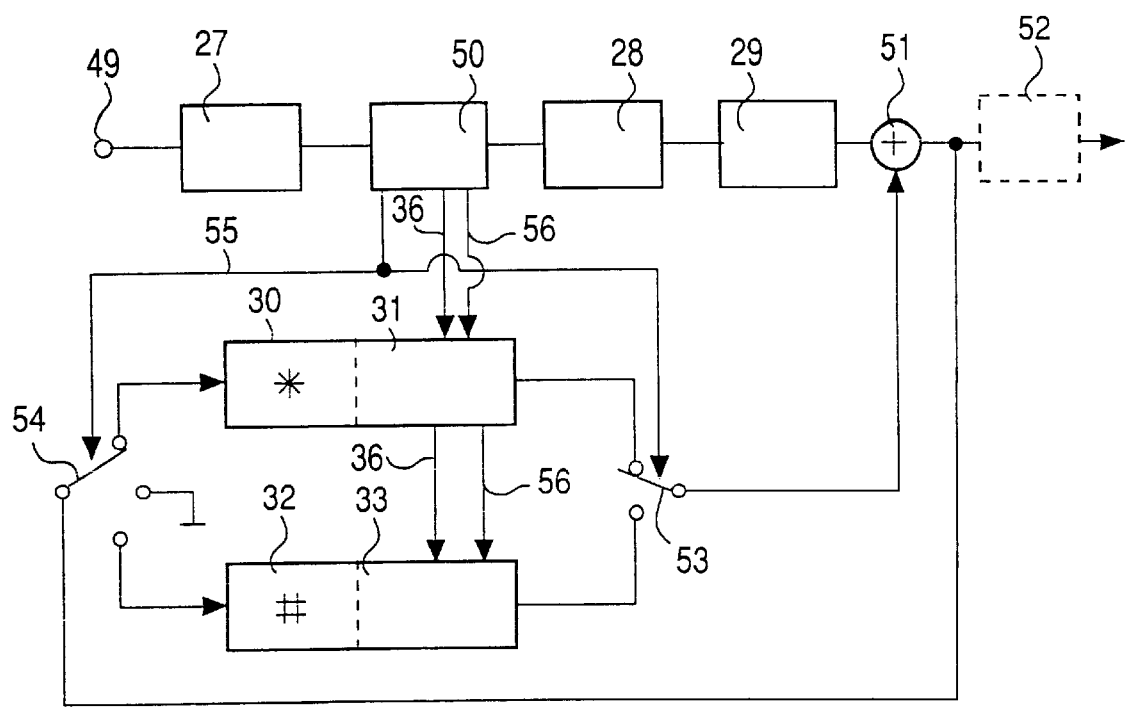
FIG. 5 shows a block diagram of a decoding device for decoding frames of a stroboscope-like special effects film.

In the text which follows, the configuration of a decoding device according to the invention is explained with reference to FIG. 5. In FIG. 5, components which are identical to those in FIG. 4 are designated by the same reference numerals as in FIG. 4. For this reason, these components will not be explained again in detail. At input 49 of the decoding device, the coded frames are present in accordance with their coding order. They are first transferred into the buffer memory 27. This is followed by a VLD unit 50. This unit 50 is used for decoding the variable length coding according to the VLC unit 25 of FIG. 4. It is also used as a demultiplexing unit for selecting certain information out of the data stream which will be explained in greater detail below. The decoded data are supplied to the dequantizing unit 28. In the IDCT unit 29, the inverse discrete cosine transformation then takes place. The data produced are forwarded to an addition unit 51. Finally, the frame produced is also resorted with respect to its frame order in a deserting unit 52. The frames are not output in the coding order but in the frame sequence in which they were present at input 20 of the coding device.

For the motion-compensated decoding of the frames, a first frame buffer 30 and a second frame buffer 32 and a first MC unit 31 and a second MC unit 33 are also provided. Into the MC units 31 and 33, the data for the motion vectors can be input via the MV bus 36. The frame present at the output of the addition unit 51 is written into one of the frame buffers 30 or 32, respectively, as reference frame to complete the decoding operation. In this connection, it should be pointed out that only the I and P frames are written into one of the frame buffers but not the B frames. The frame buffers and the associated MC units are controlled with the aid of the information inserted into the data stream with respect to the film scene identification signal and the special effects film identification signal. If no special effects film identification signal information is received, control is effected in accordance with the MPEG2 standard.

This information is filtered out of the data stream in the VLD unit 50. The information with respect to the film scene identification signal is then transmitted to the switching units 53 and 54 via line 55. In addition, however, the information whether the frame to be decoded is an I frame, a P frame or a B frame also acts on the switching unit 54. If it is a B frame, the switching unit 54 is set to its third position, in which the frame present at the output of the addition unit 51 is not entered into any of the two frame buffers 30 or 32. The switching unit 53 causes the frame motion compensated from the associated frame buffer for the corresponding film scene to be forwarded in each case to the addition unit 51. The information with respect to the special effects film identification signal is also filtered out of the data stream for the frame to be decoded by the VLD unit 50. This information is forwarded to the MC units 31 and 33 via line 56. It provides for an appropriate reconfiguration of these units so that, for example, only forward prediction is subsequently allowed for all macroblocks of the frame to be decoded or, as an alternative, that both forward and backward prediction is allowed for the macroblocks of a B frame.

Figure 6:
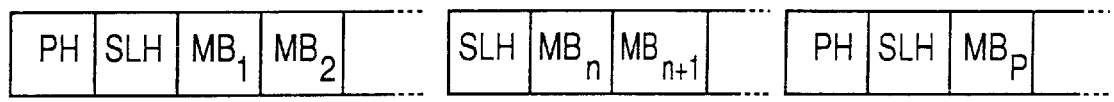
FIG. 6 shows an illustration of the data stream for a coded frame.

The rough structure of the data stream for a coded frame is shown in FIG. 6. The reference symbol PH designates a data field which contains general information on the coded frame. The reference symbol SLH designates a data field which contains associated information for a horizontal row of macroblocks of the frame to be coded. The reference symbols MB1, MB2 etc. designate data fields which contain the relevant frame data for the respective macroblocks of the horizontal row. A frame consists of a relatively large number of horizontal rows, as is indicated in FIG. 6. The start of the next frame is also shown in FIG. 6.

The additional information for the control of the frame buffers in the decoding device is additionally inserted into the data field PH for the information for the frame to be decoded.

FIG. 7 shows the configuration of the data field PH according to the MPEG2 standard, extended by the additional information according to the invention. The individual information specified with numbers 1 to 23 is defined in the MPEG2 standard and does not therefore need to be explained in greater detail at this point. According to the invention, the new information 24 and 25 is additionally inserted into the data field. The information stroboscope_mode is used for signalling that the frame belongs to the stroboscope-like special effects film sequence. One additional bit is sufficient for this information. The further information with number 25 (scene 1 flag) marks whether the frame belongs to the first film scene or to the second film scene. This information is present only when the information Stroboscope_Mode is inserted into the data stream. Since the additional information is not defined in the MPEG2 standard, only decoding devices which are additionally designed for this purpose can correctly evaluate this information. As an alternative, the two information items can also be inserted at another point within the data stream. Thus, e.g. as extension to the data field for the general frame information. Such additional extensions are permitted in the MPEG2 standard.

What is claimed is:

1. Method for coding digitized frames of a special effects film, in which alternately a first number of frames of a first film scene and a second number of frames of a second film scene is shown, two frame buffers being available for coding the frames, characterized in that the two frame buffers are operated separately so that one of the frame buffers is used for predicting frames of the first film scene and the other frame buffer is used for predicting frames of the second film scene.

2. Method according to claim 1, wherein only forward prediction is used for predicting frames of the first or second film scene.

3. Method according to claim 1, wherein forward or backward prediction is used for predicting frames of the first or second film scene, a resorting according to the MPEG2 standard being carried out for the coding order at least for the backward-predicted frames so that the backward-predicted frames are coded with a time delay and the frame from which the backward prediction is carried out is coded before the backward-predicted frame/frames.

4. Method according to claim 1, wherein information by means of which the frame buffer can be derived from which the frame have to be predicted, is inserted into the data stream for at least each predicted frame.

5. Method according to claim 1 wherein information, indicating if a frame belongs to a special effects film sequence in which alternately a first number of frames of a first film scene and a second number of frames of a second film scene is shown, is inserted into the data stream for at least each predicted frame so that the frame buffers may be operated separately.

6. Method for decoding frames, coded in accordance with the method of claim 1, of a special effects film in which alternately a first number of frames of a first film scene and a second number of frames of a second film scene are shown, two frame buffers being provided for decoding the frames, characterized in that the two frame buffers are operated separately so that one of the frame buffers is used for predicting frames of the first film scene and the other frame buffer is used for predicting frames of the second film scene.

7. Method according to claim 6, wherein only forward prediction is used for predicting frames of the first or second film scene.

8. Method according to claim 6, wherein forward or backward prediction is used for predicting frames of the first or second film scene, a resorting according to the MPEG2 standard being performed for the output order, at least for the backward-predicted frames so that the backward-predicted frames are output chronologically advanced and the frame from which the backward prediction is carried out, is output after the backward predicted frame/frames.

9. Method according to claim 6, wherein information which has been inserted into the data stream for at least each predicted frame, is used for deciding the frame buffer from which the frame has to be predicted.

10. Device for coding digitized frames of a special effects film, in which alternately a first number of frames of a first film scene and a second number of frames of a second film scene follows, having two frame buffers, characterized in that means are provided which separately operate the two frame buffers so that one of the frame buffers is used for predicting frames of the first film scene and the other frame buffer is used for predicting frames of the second film scene.

11. Device according to claim 10, wherein, as means for separate operation of the frame buffers, a first and second switching unit are provided which, controlled by a film scene flag signal selects either the first or second frame buffer for predicting the frame to be coded.

12. Device according to claim 10, wherein data insertion means are provided which, in dependence on the film scene flag signal, insert information into the data stream for at least each predicted frame, which specifies the frame buffer from which the frame has to be predicted.

13. Device according to claim 12, wherein the data insertion means, after detection of a special effects film flag signal, additionally insert information into the data stream for each frame of the special effects film, which information specifies that the frame belongs to a special effects film sequence in which alternately a first number of frames of a first film scene and a second number of frames of a second film scene follows.

14. Device according to claim 13, wherein means for setting the prediction mode are provided which, after detection of the presence of a special effects film flag signal, permanently set the forward prediction mode as prediction mode.

15. Device according to claim 13, wherein means for setting the prediction code are provided which, after detection of the presence of a special effects film flag signal, permit both forward and backward prediction as prediction mode, a resorting for the coding order being effected at least for the backward predicted frames according to the MPEG2 frame in such a manner that the backward-predicted frames are coded with time delay and the frame from which the backward prediction is performed is coded before the backward predicted frame/frames.

16. Device for decoding frames, coded in accordance with the method according to claim 1, of a special effects film in which alternately a first number of frames of a first film scene and a second number of frames of a second film scene follow, having two frame buffers, characterized in that means are provided which separately operate the two frame buffers so that one of the frame buffers is used for predicting frames of the first film scene and the other frame buffer is used for predicting frames of the second film scene.

17. Device according to claim 16, wherein, as means for the separate operation of the frame buffers, a first and second switching unit are provided which, controlled by an information in the data stream for the frame to be decoded with respect to the frame buffer to be used for the prediction, select either the first or second frame buffer.

18. Device according to claim 16, wherein means for setting the prediction mode are provided which, after detection of information in the data stream for the frame to be decoded, with respect to the flag that the frame belongs to a special effects film sequence, in which alternately a first number of frames of a first film sequence and a second number of frames of a second film scene follow, permanently set the forward prediction mode as prediction mode.

19. Device according to claim 16, wherein means for setting the prediction mode are provided which, after detection of information in the data stream for the frame to be decoded with respect to the flag that the frame belongs to a special effects film sequence in which alternately a first number of frames of the first film scene and a second number of frames of a second film scene follow, permit both forward and backward prediction as prediction mode, a resorting for the output order being effected in accordance with the MPEG2 standard, at least for the backward-predicted frames, so that the backward-predicted frames appear chronologically advanced at the output and the frame from which the prediction is effected appears/appear after the backward-predicted frame/frames at the output.

* * * * *

UNITED STATES PATENT AND TRADEMARK OFFICE
CERTIFICATE OF CORRECTION

| | |
|---|---|
| PATENT NO. | : 6,292,199 B1 |
| DATED | : September 18, 2001 |
| INVENTOR(S) | : Carsten Herpel |

Page 1 of 1

It is certified that error appears in the above-identified patent and that said Letters Patent is hereby corrected as shown below:

<u>Column 8,</u>
Line 41, delete "can be" and insert -- is --.
Line 42, delete "have to be" and insert -- must be --.

Signed and Sealed this

Twenty-third Day of April, 2002

Attest:

Attesting Officer

JAMES E. ROGAN
*Director of the United States Patent and Trademark Office*